Figure 6:
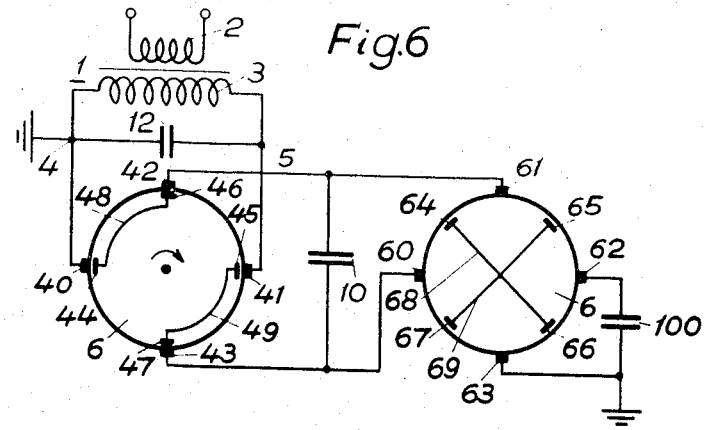

Dec. 12, 1967   J. SLETBACK ETAL   3,358,213
DEVICE FOR TRANSFORMING A FIRST ALTERNATING VOLTAGE OF A
CERTAIN FREQUENCY TO A SECOND VOLTAGE
OF ANOTHER FREQUENCY
Filed May 19, 1964
3 Sheets-Sheet 1
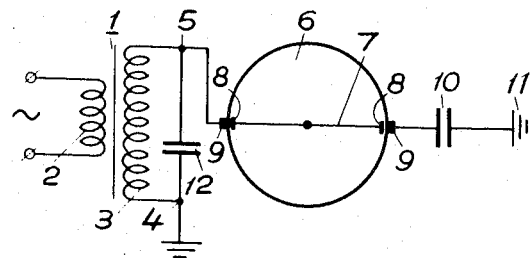
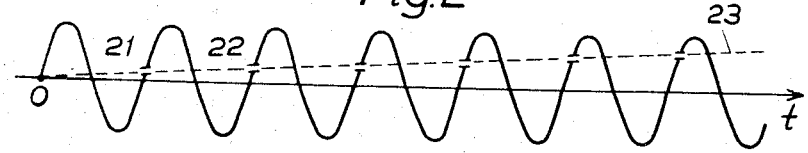
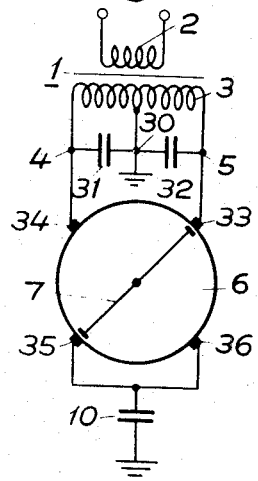
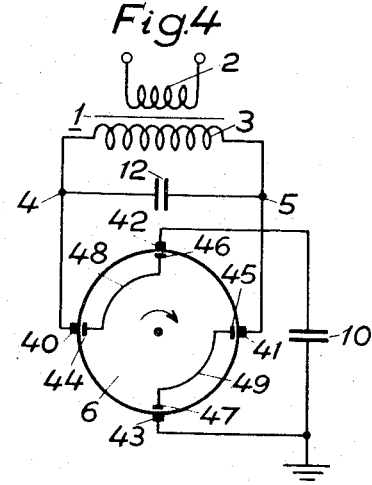
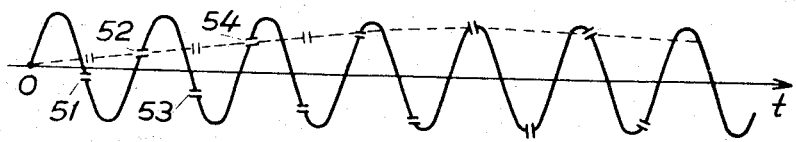
INVENTOR.
JARLE SLETBACK
LARS GÖRAN VIRSBERG
NILS HYLTÉN-CAVALLIUS
Bailey, Stephens &
Huettig

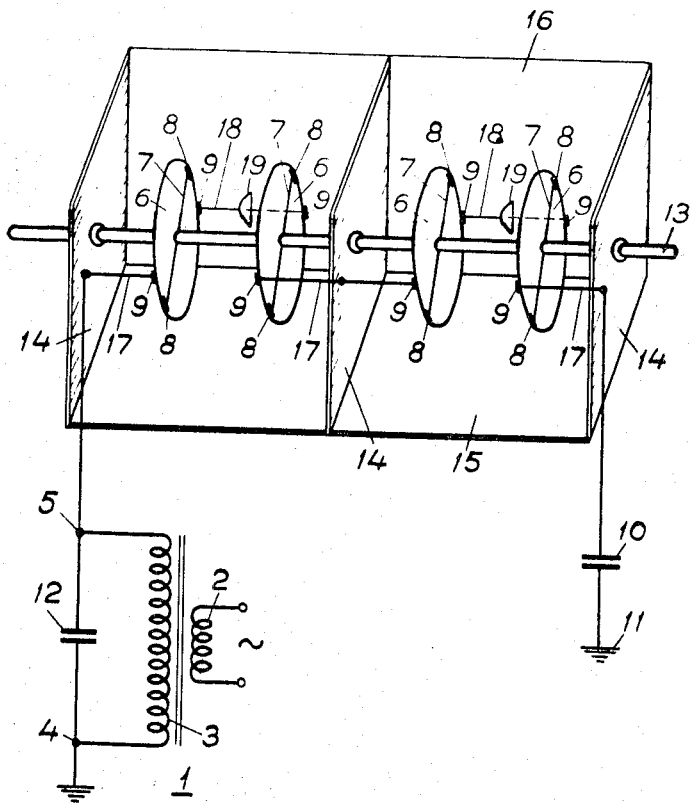

though with a load which contains at least one capacitance, over which the other alternating voltage is produced. Other characteristics are evident from the description.

United States Patent Office 3,358,213
Patented Dec. 12, 1967

3,358,213
DEVICE FOR TRANSFORMING A FIRST ALTERNATING VOLTAGE OF A CERTAIN FREQUENCY TO A SECOND VOLTAGE OF ANOTHER FREQUENCY
Jarle Sletback and Lars Göran Virsberg, Vasteras, and Nils Hyltén-Cavallius, Ludvika, Sweden, assignors to Allmänna Svenska Elektriska Aktiebolaget, Vasteras, Sweden, a corporation of Sweden
Filed May 19, 1964, Ser. No. 368,629
Claims priority, application Sweden, June 10, 1963, 6,372/63; Mar. 7, 1964, 2,893/64
4 Claims. (Cl. 321—50)

Testing of electrical insulation strength is often carried out with alternating voltage of line frequency, usually 50 or 60 cycles per second. Such testing comprises standard testing control as well as manufacturing and running maintenance control.

In such testing of objects with large capacitance, such as machine windings, cables, capacitors, etc., the necessary testing power attains values of several hundred kva. A testing equipment for these powers is necessarily both heavy and bulky and also expensive. There is therefore a need for other testing methods with a lighter and cheaper testing equipment, but which nevertheless gives substantially the same information regarding insulation strength as the testing with line frequency referred to in the introduction.

In order to simplify and in certain cases make possible the testing of objects with large capacitance, direct current tests have been used to a certain extent. This testing procedure uses a lighter testing equipment but the voltage distribution in the insulation differs from that with alternating voltage tests. The insulation is usually built up of layers of different materials with different dielectric constants $\epsilon$ and resistivity $\rho$. In alternating voltage tests the voltage distribution in the insulation will be determined by $\epsilon$ for the different materials, while in direct voltage tests on the other hand the voltage distribution is determined by the resistivity $\rho$ of the different layers. This may thus result in quite different voltage distributions in testing with alternating voltage and direct voltage. In testing of winding coils for high voltage machines testing with direct current may in addition under certain conditions result in disproportionally high strain on the coil ends compared with alternating voltage tests.

In order to avoid the disadvantages above mentioned in testing with alternating voltage of power frequency and with direct voltage, it has been proposed to carry out tests with alternating voltage of low frequency. In order to reduce the power requirement as much as possible the frequency should be chosen low, however not lower than that which gives substantially the same voltage distribution as is obtained in testing with line frequency. Examinations carried out show that these demands are fulfilled if a frequency of the order of 0.1 cycles per second is used. Since the frequency is then 1/500 of the frequency in testing with 50-period alternating voltage, the necessary testing power is reduced to about the same extent and amounts for example in a large power generator of some kva.

The present invention relates to a means for changing a first alternating voltage with a certain frequency to a second alternating voltage with another frequency. The invention is preferably intended for changing an alternating voltage with frequency 50 cycles per second to an alternating voltage with frequency 0.1 cycle per second, but is also usable for other frequency changes. The invention is characterised in that a member is arranged to electrically connect, with a periodic and intermittent movement, at a frequency deviating from the frequency of the first alternating voltage, the first alternating voltage with a load which contains at least one capacitance, over which the other alternating voltage is produced. Other characteristics are evident from the description.

Figure 7:
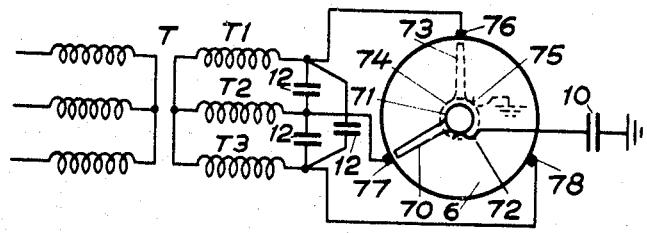
Figure 8:
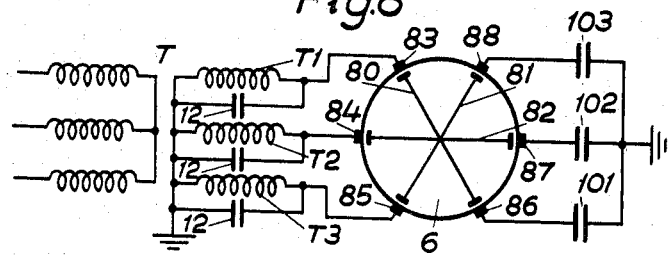

The invention will now be further described with the help of accompanying drawings, where FIGURE 1 shows an embodiment of the means. FIGURE 2 shows how a part of a period of an alternating voltage with low frequency can be obtained by changing 50-period alternating voltage. FIGURES 3 and 4 show means, where each positive and negative half-wave of the first alternating voltage is made use of and FIGURE 5 shows the appearance of the two alternating voltages in a wave diagram. FIGURE 6 shows how the means according to FIGURE 4 can be modified in order to enable earthing of both the transformer and the test object. FIGURES 7 and 8 show how the means can be constructed for feeding with three-phase voltage, while FIGURE 9 shows a modification of the means.

In FIGURE 1, 1 indicates a single-phase transformer, the primary winding 2 of which is connected to a 50-period alternating voltage network. The secondary winding 3 of the transformer is earthed at its one end 4. A rotatable member 6 may consist of a circular disc of insulating material with a diametrically running conducting connection 7. This conducting connection is formed at its ends on the periphery of the disc with contact segments 8. Immediately outside the disc two diametrically opposite fixed contacts 9 are arranged so that they engage with sufficient contact pressure against the periphery of the disc 6. In the figure the left hand contact 9 is connected to the non-earthed end 5 of the secondary winding 3. The other fixed contact 9 is connected to a load which is here represented by a capacitor 10. The other side of the capacitor is earthed at 11.

The rotatable member may also consist of a rod of conducting material equipped with contact segments at both its ends, or of a rod of insulating material with a conducting connection with contact segments arranged at the ends of the rod.

The rotatable member is arranged to be rotated in the plane of the figure by means of a motor, not shown, the number of turns of which is so regulated that the rotatable member turns somewhat less than a half turn in one period, i.e., in 1/50 second. The driving motor is in this case a 4-pole synchronous machine, which is fed with an alternating voltage with a frequency of 49.9 cycles per second.

The operation of the device according to FIGURE 1 will now be further explained with the help of FIGURE 2, where the unbroken sinusoidal curve corresponds to the alternating voltage on the secondary winding of the transformer. At the time $t=0$, which corresponds to the position shown in FIGURE 1, the voltage over the secondary winding=0. After one period the rotatable member has turned almost a half turn and first after a further 1/500 period the conducting connection 7 reconnects the two fixed contacts 9 with each other. The voltage over the secondary winding has meanwhile risen to a value which corresponds to the point 21 on the sinusoidal curve. The result is that a small current impulse is fed to the capacitor 10 and charges this somewhat. After a further 1/500 period the contacts 9 are connected with each other again. The voltage over the secondary winding 3 has then risen further to the point 22 and the capacitor voltage rises further. After 125 periods the contacts 9 will be connected to each other at precisely the moment that the voltage over the secondary winding has its maximum value. The voltage over the capacitor 10 has thus during 125 periods, i.e., 2.5 seconds, increased successively from zero to the top value of the secondary voltage, which is schematically shown by the dashed line 23 in FIGURE 2. In FIGURE 2 this voltage rise has been shown to occur in a lesser number of periods only for reasons of space. During the subsequent 2.5 seconds the voltage sinks over the capacitor 10, since for each half turn of the rotatable member it is connected with the secondary voltage of the transformer, which is lower than the capacitor voltage, so that the capacitor is discharged by a small amount each time it is connected with the secondary winding and after 5 seconds from the starting position the voltage over the capacitor is zero. During the following 5 seconds the above described process is repeated but with reversed polarity of voltage. The result is that across the capacitor 10 an alternating voltage arises with the frequency 0.1 cycles per second, i.e., the difference between the network frequency and the frequency of the current to the driving means for the rotatable member.

In order to increase the amount of energy in the impulse which upon contact closing is transferred from the secondary winding 3 to the capacitor 10, it may be suitable to parallel-connect the secondary winding to a capacitor 12.

As is evident from FIGURE 2 the low frequency voltage on the capacitor 10 is made up of small parts, 21, 22, etc., which are taken out, one during each period of the 50-period voltage. It is however also possible to allow the low frequency voltage to be built up of parts from each positive and negative half-period of the 50-period voltage, and this can be done with a device according to FIGURES 3 and 4.

According to FIGURE 3 the secondary winding 3 of the transformer is earthed at its centre point 30. The two winding halves are connected in parallel in a similar way as shown in FIGURE 1 each with a capacitor 31 and 32. The free end 5 of the upper winding half is connected to a fixed contact 33, while the free end 4 of the lower winding half is connected to another fixed contact 34, which is situated 90° from the contact 33. Diametrically opposite to the contacts 33 and 34 two other fixed contacts 35 and 36 are arranged and connected with each other and with one side of the capacitor 10. The other side of the capacitor is earthed.

The operation of this device will now be explained with the help of FIGURE 5. At the time $t=0$ the rotatable member 6 has the position shown in FIGURE 3. The voltage at the point 5 is zero and thereby the voltage over the capacitor 10 is also zero. When the rotatable member 6 has turned a quarter turn, the contacts 34 and 36 are connected by the conducting connection 7. The voltage over the secondary winding is now directed in the other direction and has a value which is represented by the point 51 on the sinusoidal curve. At the moment connection occurs between the contacts 34 and 36, the capacitor 10 receives a charging impulse. After a further 90° turning of the rotatable member connection between the contacts 33 and 35 is restored. The voltage over the secondary winding then has the value which corresponds to the point 52 and the capacitor 10 receives a new impulse with somewhat higher voltage. The voltage over the capacitor 10 is thus built up by a charging impulse for each half-period of the 50-period voltage. Alternate charging impulses are delivered during the positive and the negative half-periods of the 50-period voltage, respectively, and the charging and discharging, respectively, of the capacitor 10 thus takes place thereby in twice as many steps as in the device according to FIGURE 1. On the other hand only half the secondary voltage is used in each charging impulse. In FIGURE 5 is shown only schematically and with the use of merely a few periods of the 50-period alternating voltage how a part of a period of the low frequency alternating voltage arises. From what is stated in connection with the description of FIGURE 2 it should however be easily understood how the low frequency alternating voltage arises.

With the device shown in FIGURE 4 the capacitor 10 receives a charging impulse for each half period and thus the whole secondary voltage is used for each charging impulse. The one end 4 of the secondary winding 3 is connected to a fixed contact 40, while its other end 5 is connected to a contact 41 situated diametrically opposite to the contact 40. The capacitor 10 is connected to two contacts 42 and 43. The rotatable member 6 has four symetrically arranged contact segments 44, 45, 46 and 47. Of these two adjacent contact segments are connected to each other. Thus the contact segments 44 and 46 are connected to each other by means of a conducting connection 48 and the contacts 45 and 47 are connected by means of the connection 49.

In the position shown in FIGURE 4 the one end 4 of the secondary winding is thus connected to one side of the capacitor by means of the contacts 40 and 42, the contact segments 44 and 46 and the connection 40. The other end of the secondary winding is in a similar way connected to the other side of the capacitor and the whole secondary voltage lies across the capacitor 10. The operation in the arrangement corresponds in principle with that of the arrangement according to FIGURE 3.

With the device according to FIGURE 4 it is not possible to earth one of the ends of the secondary winding, since the other end will also be earthed twice per turn of the rotating member. The device may then be completed as shown in FIGURE 6, where one end 4 of the secondary winding is earthed. The device is here completed with a further rotatable member which rotates synchronously with the one already present. The second rotating member is provided with four symmetrically arranged segments 64, 65, 66 and 67, while the diagonally lying contact segments are connected to each other by means of conducting connections 68 and 69. Along the periphery of the rotatable member four symmetrically positioned fixed contacts 60, 61, 62 and 63 are arranged, which co-operate with the contact segments on the rotatable member during its rotation. The contacts 60 and 61 are connected to the capacitor 10, while the contacts 62 and 63 are connected with an other capacitor 100. The two rotatable members are so set that the capacitors 10 and 100 are not connected with each other when the capacitor 10 receives a charging impulse from or gives a discharging impulse to the transformer. The other rotatable member transmits the charge from the capacitor 10 to the capacitor 100 and from the capacitor 100 to the capacitor 10. The capacitor 100 represents in this case the load.

With all arrangements above shown single-phase voltage has been used. It is however also possible to use three-phase voltage and FIGURE 7 shows such an arrangement. The rotating member here supports a contact arm 70, which at its centre of rotation is connected to a slip ring 71. A brush 72 lies against the slip ring and is also connected with the capacitor 10. At a safe insulation distance from the contact arm 70 a second contact arm 73 is arranged which is connected with the other slip ring 74, against which a second brush 75 lies. This brush is earth-connected and thus also connected with the earthed side of the capacitor 10. These three last elements are considered to lie on the further side of the rotatable member and are therefore shown with broken lines. The two contact arms have an angle distance of 120° from each other. The three secondary windings T1, T2 and T3 of the transformer T are connected each to its fixed contacts 76, 77 and 78, which in a way mentioned earlier are arranged symmetrically around the rotatable member so that they can co-operate with the rotatable contact arms. Capacitors 12 may also here be connected over the secondary winding terminal of the transformer in the same way as in FIGURE 1. By means of the shown arrangement of contact arms and fixed contacts the capacitor 10 will be charged to the main voltage of the transformer.

FIGURE 8 shows how the device according to FIGURE 1 can be modified for use for a three-phase load. This device may be used for example for simultaneous voltage testing of all three phases in a three-phase machine or apparatus. The rotatable member supports three conducting connections 80, 81, and 82 arranged symmetrically and insulated from each other, and each supporting two diametrically situated contact segments. The device contains six further contacts 83, 84, 85, 86, 87, and 88 symmetrically arranged around the rotatable member. Of these contacts 83, 84, and 85 are connected each to a secondary winding of the transformer, while 86, 87 and 88 are connected each to a capacitor 101, 102 and 103. The other sides of the capacitors are connected with each other and earthed. Since the voltage on each capacitor is built up of voltage impulses from all three phase, the speed of rotation of the rotatable member must be only a third of the speed of rotation in the device according to FIGURE 1.

The embodiments now shown and described are not to be regarded as the only possibilities, but merely state some possible solutions of the problem of generating in a simple way a low frequency high voltage, which is especially suitable for testing purposes. It has been presumed throughout that the rotatable member is driven at a sub-synchronous speed so that its driving motor is fed with 49.9 cycles per second if the network voltage has the frequency 50 cycles per second. It is however quite clear that the rotatable member may be driven over-synchronously, i.e., with 50.1 cycles per second, and the result is the same. For the same reason it is also clear that if it is desired to generate an alternating voltage of 1 cycle per second the rotatable member will be driven with 49 or 51 cycles per second.

Since relatively high voltages are involved, of the order of 100 kv., the dimensions of the rotatable member must be rather large in order that the insulation level shall be safe. By building the apparatus in a pressure vessel and increasing the pressure the dimensions may be smaller.

The driving means for the rotatable member 6 may be made in several ways. One of these is that a synchronous motor for 50 cycles per second drives the member through a change speed arrangement which may be an ordinary gear wheel or by means of cone belts. Another method is to drive the rotatable member by means of a synchronous motor, the stator of which is driven by another motor. If the synchronous motor is 4-pole and its stator is driven at 3 turns/min., the rotatable member rotates with the same speed as if its driving motor is fed with 49.9 or 50.1 cycles per second depending on the direction of rotation of the stator in relation to the rotor. In a third method the rotatable member is driven by a synchronous motor which is supplied with alternating voltage with the frequency 49.9 or 50.1 cycles per second. Alternating voltages with these frequencies can be obtained in a known way and there is no reason to go into this here. Also other driving methods are feasible.

In the modification shown in FIGURE 9 the rotatable member consists of four circular discs 6 of insulating material, which are arranged on an axle 13, which is also suitably of insulating material. The axle is rotated by a synchronous motor, not shown, which is fed with a frequency of 49.9 or 50.1 cycles per second. The axle 13 is journalled in three parallel and vertical plates 14 of insulating material, which are supported by a horizontal plate 15 and a vertical side wall 16 which is also of insulating material. The rotatable member is arranged in a box which is open upwards and on one side and which is divided into two parts by means of the centre one of the plates 14. Each of the discs 6 has a diametrically running conducting connection 7, which at each end is connected to contact segments 8 arranged on the periphery of the disc. Immediately outside each disc two diametrically opposite fixed contacts 9 are arranged so that they engage with sufficient contact pressure against the periphery of the disc and thereby also against the contact segments 8. For each disc one of the fixed contacts 9 is supported by a conducting element 17 which is fixed into one of the plates 14. The other fixed contacts 9 are supported by conducting elements 18, which by means of frames 19 are fixed in the vertical side wall 16. One of the fixed contacts 9 which co-operates with the left rotatable disc 6 is connected with one end of the secondary winding of the transformer. The corresponding fixed contact 9, which co-operates with the right rotatable disc is connected to the capacitor 10 which represents a test object. Twice per rotation of the rotatable member the capacitor 10 will thus be connected to the transformer by means of the conducting elements 17, the contacts 9, the contact segments 8 and the conducting connections 7 arranged on the discs 6.

The centre plate 14 does not merely serve to support a bearing for the axle 13 but it constitutes primarily insulation between two axially adjacent fixed contacts 9 which are not permanently connected to each other. This means that two rotating discs 6 which are separated by such an insulating wall may be arranged very near to each other without risk of flash-over between the contacts. In the same way insulating plates can be inserted between the two left-hand and two right-hand rotating discs 6 and thereby the axial dimensions of the whole arrangement can be considerably decreased.

By means of the embodiment of the invention now described a division of the interruption path into several parts is obtained.

The field distribution which is obtained is considerably more favourable wth regard to the insulation strength and the total diameter of the rotating discs may be made smaller than the disc diameter which is required when a single disc is used. In addition a considerable reduction of the rotating mass is obtained and its inertia and gyro forces are reduced.

The modification shown should be regarded only as an example of how the invention can be realised and it can be modified in many ways. This applies especially regarding the rotatable member. The solid disc 6 can thus be replaced by a ring which is supported by a number of spokes fixed into a hub arranged on the axle 13. Another possibility is to arrange the contact segments 8 on a rod which is fixed perpendicularly to the axle. In order to avoid impact against the fixed contacts 9 suring contact closing the contact segment 8 can be replaced by a plate spring-like contact member arranged at each end of the rod with its plane in the plane of rotation of the rod. The fixed contacts could then consist of two spring elements lying against each other, between which the rotating contact member can pass. In a modification of the design shown in FIGURE 4 the rotatable member consists of two rods arranged perpendicularly to each other on the axle 13. Other designs are also feasible. The number of rotatable members may easily be adapted to the required voltage level. Further the arrangement and design of the fixed contacts can be varied in many different ways. Such a contact may for example be enclosed in a sphere of conducting material, whereby a specially favourable field distribution is obtained and this can cause the plates 14 arranged between the rotatable members to be unnecessary.

The rotatable member may be exchanged for controlled contacts, Hg-relays or the like for connecting the first alternating voltage to the load at suitable times.

We claim:

1. Device for transforming a first alternating voltage of a certain frequency to a second alternating voltage of a frequency which is lower than that of said first voltage, said device including a source of said first voltage, said source comprising an alternating voltage transformer having a primary winding connected to a network for said first alternating voltage and a secondary winding, a capacitor load, a movable connecting means connecting said secondary winding to said capacitor load periodically at a frequency which is the difference between said first and said second voltage, said connecting means being rotatable and having an even number of contact segments connected in pairs and having an equal number of fixed contacts positioned to cooperate with said contact segments when said connecting means is rotated, alternate fixed contacts being connected to said source of the first voltage and to said capacitor load, respectively.

2. Device according to claim 1, having a second capacitor and a second rotatable connecting means, said second connecting means connecting said capacitor load to said second capacitor during intervals when said capacitor load is disconnected from the secondary winding of said alternating voltage transformer.

3. Device for transforming a first alternating voltage of a certain frequency to a second alternating voltage of another frequency, the frequency of said second voltage being lower than that of said first voltage, said source comprising a three phase alternating voltage transformer having primary windings connected to a three-phase network for said first alternating voltage and three-phase secondary windings, a capacitor load, a rotatable connecting means, said connecting means comprising three conductors symmetrically arranged around the rotation axis of said means, each of said conductors having a contact segment at each of its ends, said connecting means further including six fixed contacts arranged symmetrically around the periphery of said rotatable means and engageable with said contact segments, the secondary windings of said transformer being connected each to a different one of said fixed contacts, said capacitor load comprising three capacitors, the others of said fixed contacts being connected each to a different one of said three capacitors.

4. Device for transforming a first alternating voltage of a certain frequency to a second alternating voltage of another frequency which is lower than the frequency of said first voltage, a source of said first voltage, said source comprising an alternating voltage transformer having a primary and a secondary winding, said primary winding connected to a network of said first voltage, a capacitor load, a rotatable connecting means connecting said secondary winding to said capacitor load periodically at a frequency which is the difference between the frequencies of said first and said second voltage, said rotatable connecting means comprising a rotatable shaft, a plurality of circular discs arranged on said shaft with their planes perpendicular to said shaft, each of said discs having a conductor mounted diametrically on said disc and having a contact segment at each end of said conductor on the periphery of said disc, two fixed contacts arranged symmetrically around the periphery of each of said discs for cooperation with said contact segments, one of the two fixed contacts cooperating with the first of said discs being connected to said source, one of the two fixed contacts cooperating with the last of said discs being connected to said load, one of the said fixed contacts cooperating with each disc being connected to one of the fixed contacts cooperating with an adjacent disc, said discs being spaced longitudinally along said shaft, said shaft being formed of insulating material, and a plate of insulating material arranged between some of said discs.

References Cited

UNITED STATES PATENTS

| | | | |
|---|---|---|---|
| 1,181,711 | 5/1916 | Wilson | 321—60 X |
| 2,038,960 | 4/1936 | Schattanik | 321—50 X |
| 2,636,155 | 4/1953 | Robinson | 321—70 X |
| 3,093,787 | 6/1963 | Taylor | 321—70 X |

FOREIGN PATENTS 729,112    5/1955    Great Britain.

JOHN F. COUCH, *Primary Examiner.*

G. GOLDBERG, *Assistant Examiner.*